US008086516B2

(12) United States Patent
Tuckman

(10) Patent No.: US 8,086,516 B2
(45) Date of Patent: *Dec. 27, 2011

(54) METHODS AND SYSTEMS FOR INTEREST RATE PREDICTION

(75) Inventor: Bruce Tuckman, New York, NY (US)

(73) Assignee: Barclays Capital Inc., New York, NY (US)

( * ) Notice: Subject to any disclaimer, the term of this patent is extended or adjusted under 35 U.S.C. 154(b) by 100 days.

This patent is subject to a terminal disclaimer.

(21) Appl. No.: 12/756,358

(22) Filed: Apr. 8, 2010

(65) Prior Publication Data

US 2010/0198744 A1  Aug. 5, 2010

Related U.S. Application Data

(62) Division of application No. 11/212,408, filed on Aug. 26, 2005, now Pat. No. 7,885,884.

(51) Int. Cl.
*G06Q 40/00* (2006.01)
(52) U.S. Cl. ............................ 705/36 R; 705/35; 705/37
(58) Field of Classification Search ............... 705/35–37
See application file for complete search history.

(56) References Cited

U.S. PATENT DOCUMENTS 7,236,953 B1 * 6/2007 Cooper et al. ............... 705/36 R
2002/0198750 A1 * 12/2002 Innes et al. ........................ 705/7

OTHER PUBLICATIONS

Crescenzi, Anthony "How the Fed Moves Futures", Mar. 1, 2004, Futures Magazine Group.*

Tuckman, Bruce "Fixed Income Securities", 2002, John Wiley & Sons, Inc, Chapter 17.*
Brian Sack "Extracting the Expected Path of Monetary Policy from Futures Rates", Sep. 17, 2002, Division of Monetary Affairs Board of Governors of the Federal Reserve System.*
Lange et al., "Anticipations of monetary policy in financial markets". Apr. 10, 2001, Journal of Money, Credit & Banking, 35, 6, 889(21).*
Des Mc Manus, "The Information Conent of Interest Rate Futures Options", Bank of Canada, available from the Bank of Canada.*

* cited by examiner

*Primary Examiner* — Narayanswamy Subramanian
*Assistant Examiner* — Ryan D Donlon
(74) *Attorney, Agent, or Firm* — Morgan, Lewis & Bockius LLP

(57) ABSTRACT

In one aspect, the invention comprises a computer-implemented method for predicting interest rates, comprising the steps of: electronically receiving data describing one or more Fed fund futures rates; electronically adjusting the data describing the one or more Fed fund futures rates to obtain adjusted data regarding the one or more Fed fund futures rates; and electronically determining data regarding one or more expected Fed fund target rates. In another aspect, the invention comprises a system for predicting interest rates, comprising: one or more processors operable to determine probability distribution data for one or more Eurodollar rates based on Eurodollar futures option data; one or more processors operable to link said probability distribution data for one or more Eurodollar rates to overnight forward Fed funds rate data; and one or more processors operable to link said forward Fed funds rate data to expected Fed funds rate data.

2 Claims, 4 Drawing Sheets

FIG. 2

| Market Monitor Reports | | | | ☐ Offerings | | | |
|---|---|---|---|---|---|---|---|
| FEDISCOPE | | | | | | | |
| Graph Distribution Pricing Advanced Help | | | | | | | |
| Price Date : | | | | 210 | | | 09/04/2003 |
| Fed fund futures | | | | | FF vs. 3-mo LIBOR Basis Swaps | | |
| Contract | Market Price | Market Rate | Model Rate | Mkt-Mod bps | Maturity | | Mkt. Spread |
| FFU3 | 98.990 | 1.010 | 1.010 | -0.0 | 3M | | 12.25 |
| FFV3 | 98.990 | 1.010 | 1.023 | 1.3 | 6M | | 15.00 |
| FFX3 | 98.985 | 1.015 | 1.015 | 0.0 | 9M | | 15.75 |
| FFZ3 | 98.985 | 1.015 | 1.015 | 0.0 | 12M | | 15.50 |
| | | | | | 15M | | 15.75 |
| | | | | 230 | 18M | | 16.00 |
| | | | | | 21M | | 16.00 |
| | | | 220 | | 24M | 240 | 16.00 |
| Eurodollar Futures | | | | | Risk Premium | | |
| Contract | Market Price | Market Rate | Model Rate | Mkt-Mod bps | Forward Basis | Basis Points per year | 13 |
| EDU3 | 98.842 | 1.158 | 1.158 | -0.0 | 14.0 | | |
| EDZ3 | 98.755 | 1.245 | 1.243 | 0.2 | 17.3 | | |
| EDH4 | 98.520 | 1.480 | 1.480 | -0.0 | 16.9 | | |
| EDM4 | 98.120 | 1.880 | 1.880 | -0.0 | 14.1 | | |
| EDU4 | 97.665 | 2.335 | 2.335 | -0.0 | 16.3 | | |
| EDZ4 | 97.170 | 2.830 | 2.830 | -0.0 | 16.3 | | 250 |
| EDH5 | 96.710 | 3.290 | 3.290 | 0.0 | 14.5 | | |

Options on Eurodollar Futures (option Expiry-Futures Expiry, bold Items are used for calibration)

| Contract | Strike | Mkt Price Call | Mod Price Call | Mod-Mkt Call | Mkt Price Put | Mod Price Put | Mkt-Mod Put |
|---|---|---|---|---|---|---|---|
| EDU3 | 98.000 | 0.843 | 0.842 | -0.000 | | | |
| | 98.250 | 0.593 | 0.592 | -0.000 | 0.001 | 0.000 | -0.001 |
| | 98.500 | 0.343 | 0.342 | -0.000 | 0.001 | 0.000 | -0.001 |
| | 98.625 | | | | 0.001 | 0.002 | 0.001 |
| | 98.750 | 0.095 | 0.100 | 0.005 | 0.003 | 0.007 | 0.005 |
| | 98.875 | 0.003 | 0.000 | -0.002 | 0.035 | 0.033 | -0.002 |
| | 99.000 | 0.001 | 0.000 | -0.001 | 0.158 | 0.157 | -0.000 |
| | 99.125 | 0.001 | 0.000 | -0.001 | 0.282 | 0.282 | -0.000 |
| | 99.250 | 0.001 | 0.000 | -0.001 | 0.407 | 0.407 | -0.000 |
| EDZ3 | 98.375 | 0.393 | 0.387 | -0.005 | 0.013 | 0.006 | -0.006 |
| | 98.500 | 0.273 | 0.281 | 0.009 | 0.018 | 0.025 | 0.008 |
| | 98.625 | 0.165 | 0.176 | 0.011 | 0.035 | 0.044 | 0.009 |
| | 98.750 | 0.072 | 0.071 | -0.001 | 0.068 | 0.064 | -0.003 |
| | 98.875 | 0.025 | 0.039 | 0.014 | 0.145 | 0.156 | 0.011 |
| | 99.000 | 0.013 | 0.006 | -0.007 | 0.258 | 0.248 | -0.009 |
| | 99.125 | 0.007 | 0.001 | -0.007 | 0.378 | 0.368 | -0.010 |
| | 99.250 | 0.003 | 0.001 | -0.002 | 0.497 | 0.492 | -0.005 |
| EDH4 | 97.750 | 0.802 | 0.802 | -0.001 | 0.035 | 0.036 | 0.001 |
| | 98.000 | 0.573 | 0.574 | 0.001 | 0.055 | 0.057 | 0.002 |
| | 98.250 | 0.362 | 0.366 | 0.003 | 0.095 | 0.097 | 0.002 |
| | 98.500 | 0.195 | 0.197 | 0.002 | 0.175 | 0.177 | 0.002 |
| | 98.750 | 0.062 | 0.064 | 0.002 | 0.292 | 0.293 | 0.001 |
| | 99.000 | 0.018 | 0.015 | -0.002 | 0.495 | 0.493 | -0.002 |
| | 99.250 | 0.010 | 0.006 | -0.004 | 0.738 | 0.732 | -0.006 |
| | 99.500 | 0.003 | 0.000 | -0.003 | 0.980 | 0.975 | -0.005 |

| | 2003 09/16 | 2003 12/09 | 2004 03/16 | 2004 06/30 | 2004 09/21 | 2004 12/14 | 2005 03/22 |
|---|---|---|---|---|---|---|---|
| Mean | 1.01 | 0.97 | 1.22 | 1.68 | 2.04 | 2.47 | 2.95 |
| 0.00 | 0.0 | 0.0 | 0.0 | 0.0 | 0.0 | 0.0 | 0.0 |
| 0.25 | 0.0 | 0.0 | 2.3 | 0 | 3.1 | 2.8 | 2.7 |
| 0.50 | 0.0 | 0.3 | 1.6 | 0 | 5.5 | 4.7 | 4.4 |
| 0.75 | 0.0 | 25.9 | 16.3 | 0 | 6.9 | 5.7 | 4.9 |
| 1.00 | 95.8 | 58.2 | 34.0 | 20 | 7.9 | 6.2 | 4.7 |
| 1.25 | 4.2 | 14.9 | 14.1 | 20 | 8.6 | 6.6 | 4.6 |
| 1.50 | 0.0 | 0.6 | 16.0 | 20 | 9.0 | 6.6 | 4.8 |
| 1.75 | 0.0 | 0.0 | 7.6 | 20 | 9.7 | 6.9 | 5.6 |
| 2.00 | 0.0 | 0.0 | 3.1 | 20 | 9.9 | 7.4 | 6.1 |
| 2.25 | 0.0 | 0.0 | 2.5 | 0 | 8.7 | 7.5 | 5.8 |
| 2.50 | 0.0 | 0.0 | 1.3 | 0 | 6.6 | 7.6 | 5.7 |
| 2.75 | 0.0 | 0.0 | 0.0 | 0 | 4.5 | 6.9 | 6.1 |
| 3.00 | 0.0 | 0.0 | 0.0 | 0 | 3.0 | 6.1 | 7.0 |
| 3.25 | 0.0 | 0.0 | 0.4 | 0 | 2.5 | 4.7 | 6.7 |
| 3.50 | 0.0 | 0.0 | 0.1 | 0 | 2.5 | 3.3 | 5.8 |
| 3.75 | 0.0 | 0.0 | 0.2 | 0 | 2.6 | 2.2 | 4.4 |
| 4.00 | 0.0 | 0.0 | 0.3 | 0 | 2.0 | 1.6 | 3.0 |
| 4.25 | 0.0 | 0.0 | 0.3 | 0 | 1.3 | 1.6 | 1.7 |
| 4.50 | 0.0 | 0.0 | 0.0 | 0 | 1.0 | 1.7 | 0.9 |
| 4.75 | 0.0 | 0.0 | 0.0 | 0 | 1.0 | 1.2 | 0.2 |
| 5.00 | 0.0 | 0.0 | 0.0 | 0 | 1.0 | 0.8 | 0.0 |
| 5.25 | 0.0 | 0.0 | 0.0 | 0 | 0.9 | 0.7 | 0.1 |
| 5.50 | 0.0 | 0.0 | 0.0 | 0 | 0.6 | 0.8 | 0.2 |
| 5.75 | 0.0 | 0.0 | 0.0 | 0 | 0.4 | 0.9 | 0.4 |
| 6.00 | 0.0 | 0.0 | 0.0 | 0.0 | 0.2 | 1.0 | 0.9 |
| 6.25 | 0.0 | 0.0 | 0.0 | 0.0 | 0.2 | 1.1 | 1.7 |
| 6.50 | 0.0 | 0.0 | 0.0 | 0.0 | 0.2 | 1.0 | 2.6 |
| 6.75 | 0.0 | 0.0 | 0.0 | 0.0 | 0.0 | 0.9 | 3.1 |
| 7.00 | 0.0 | 0.0 | 0.0 | 0.0 | 0.0 | 0.8 | 3.0 |
| 7.25 | 0.0 | 0.0 | 0.0 | 0.0 | 0.0 | 0.5 | 2.1 |

FIG. 3

| Graph | Distribution | Pricing | Advanced | Help | | | |
|---|---|---|---|---|---|---|---|
| Eurodollar Futures | | | | | Risk Premium | | |
| Contract | Market Price | Market Rate | Model Rate | Mkt-Mod bps | Forward Basis | Basis Points per year | 13 |
| EDU3 | 98.842 | 1.158 | 1.158 | -0.0 | 14.0 | | |
| EDZ3 | 98.755 | 1.245 | 1.243 | 0.2 | 17.3 | | |
| EDH4 | 98.520 | 1.480 | 1.481 | -0.1 | 16.9 | | |
| EDM4 | 98.120 | 1.880 | 1.718 | 16.2 | 14.1 | | |
| EDU4 | 97.665 | 2.335 | 2.316 | 1.9 | 16.3 | | |
| EDZ4 | 97.170 | 2.830 | 2.828 | 0.2 | 16.3 | | |
| EDH5 | 96.710 | 3.290 | 3.292 | -0.2 | 14.5 | | |

| Options on Eurodollar Futures (option Expiry-Futures Expiry, bold items are used for calibration) | | | | | | | |
|---|---|---|---|---|---|---|---|
| Contract | Strike | Mkt Price Call | Mod Price Call | Mod-Mkt Call | Mkt Price Put | Mod Price Put | Mkt-Mod Put |
| EDU3 | 98.000 | 0.843 | 0.842 | -0.000 | | | |
| | 98.250 | 0.593 | 0.592 | -0.000 | 0.001 | 0.000 | -0.001 |
| | 98.500 | 0.343 | 0.342 | -0.000 | 0.001 | 0.000 | -0.001 |
| | 98.625 | | | | 0.001 | 0.002 | 0.001 |
| | 98.750 | 0.095 | 0.100 | 0.005 | 0.003 | 0.007 | 0.005 |
| | 98.875 | 0.003 | 0.000 | -0.003 | 0.035 | 0.033 | -0.002 |
| | 99.000 | 0.001 | 0.000 | -0.001 | 0.158 | 0.158 | 0.000 |
| | 99.125 | 0.001 | 0.000 | -0.001 | 0.282 | 0.283 | 0.000 |
| | 99.250 | 0.001 | 0.000 | -0.001 | 0.407 | 0.408 | 0.000 |
| EDZ3 | 98.375 | 0.393 | 0.387 | -0.005 | 0.013 | 0.006 | -0.006 |
| | 98.500 | 0.273 | 0.281 | 0.009 | 0.018 | 0.025 | 0.008 |
| | 98.625 | 0.185 | 0.176 | 0.011 | 0.035 | 0.044 | 0.009 |
| | 98.750 | 0.072 | 0.071 | -0.001 | 0.060 | 0.064 | -0.003 |
| | 98.875 | 0.025 | 0.038 | 0.013 | 0.145 | 0.156 | 0.011 |
| | 99.000 | 0.013 | 0.006 | -0.007 | 0.258 | 0.248 | -0.009 |
| | 99.125 | 0.007 | 0.001 | -0.007 | 0.378 | 0.368 | -0.010 |
| | 99.250 | 0.003 | 0.000 | -0.002 | 0.497 | 0.492 | -0.005 |
| EDH4 | 97.750 | 0.802 | 0.801 | -0.002 | 0.035 | 0.036 | 0.001 |
| | 98.000 | 0.573 | 0.573 | 0.001 | 0.055 | 0.057 | 0.002 |
| | 98.250 | 0.362 | 0.365 | 0.003 | 0.095 | 0.098 | 0.003 |
| | 98.500 | 0.195 | 0.197 | 0.002 | 0.175 | 0.178 | 0.003 |
| | 98.750 | 0.062 | 0.064 | 0.002 | 0.292 | 0.294 | 0.002 |
| | 99.000 | 0.018 | 0.015 | -0.002 | 0.495 | 0.494 | -0.001 |
| | 99.250 | 0.010 | 0.006 | -0.004 | 0.738 | 0.733 | -0.005 |
| | 99.500 | 0.003 | 0.000 | -0.003 | 0.980 | 0.976 | -0.004 |
| EDM4 | 97.250 | 0.965 | 1.024 | 0.059 | 0.100 | 0.000 | -0.100 |
| | 97.500 | 0.750 | 0.777 | 0.027 | 0.135 | 0.001 | -0.134 |
| | 97.750 | 0.552 | 0.535 | -0.017 | 0.185 | 0.007 | -0.178 |
| | 98.000 | 0.385 | 0.329 | -0.056 | 0.265 | 0.049 | -0.216 |
| | 98.250 | 0.245 | 0.173 | -0.072 | 0.375 | 0.140 | -0.235 |
| | 98.500 | 0.128 | 0.058 | -0.069 | 0.505 | 0.273 | -0.232 |
| | 98.750 | 0.055 | 0.008 | -0.047 | 0.680 | 0.471 | -0.209 |
| | 99.000 | 0.020 | 0.000 | -0.020 | 0.895 | 0.711 | -0.184 |
| EDU4 | 96.750 | 1.103 | 1.099 | -0.003 | 0.195 | 0.175 | -0.020 |
| | 97.000 | 0.905 | 0.901 | -0.004 | 0.245 | 0.224 | -0.021 |
| | 97.250 | 0.715 | 0.704 | -0.011 | 0.305 | 0.273 | -0.032 |
| | 97.500 | 0.547 | 0.544 | 0.004 | 0.385 | 0.360 | -0.025 |

FIG. 4

METHODS AND SYSTEMS FOR INTEREST RATE PREDICTION

CROSS-REFERENCE TO RELATED APPLICATIONS

This application is a divisional of U.S. patent application Ser. No. 11/212,408 filed Aug. 26, 2005, which claims the benefit of U.S. Provisional Application No. 60/604,592, filed Aug. 26, 2004. The entire contents of both applications are incorporated herein by reference.

BACKGROUND

The Federal funds rate ("Fed funds rate") is the interest rate at which banks lend to each other overnight. As such, it is a market interest rate. The Federal Reserve Board ("Fed") sets a target for the Fed funds rate, and keeps the rate on target via open market operations. Unless otherwise specified, references to the Fed funds rate are actually to the Fed funds rate target (also referred to herein as the Fed funds target rate). On any given day, the actual rate may differ from the target rate slightly.

The Fed funds rate target is set by the Federal Open Market Committee (FOMC), the Fed's monetary policy committee. As the U.S. short-term benchmark, the Fed funds rate target influences market interest rates throughout the world. If fixed income traders and investors have one common interest, it is the path of the Fed funds target rate. From time to time, everyone asks the following question: are security prices fair given where I think the Fed funds rate can go over the next year or two?

In formulating opinions about future values of the Fed funds target rate, market participants rely on many inputs: fundamental economic quantities such as GDP (gross domestic product) growth, inflation, and unemployment; press releases of the FOMC and statements of individual board members; the synthesized analyses of economists; and, finally, market prices as an indicator of consensus opinion.

Several ways of backing out market views from security prices are popular among traders and investors. In one such method, changes in Fed fund futures rates are taken to be changes in the path of Fed funds expected by the market. For example, if the current target rate is 1% and the fed fund futures rate in 6 months is 1.10%, it is concluded that the Fed is expected to tighten by an average of 10 bp over the next 6 months. This particular method is not wholly satisfactory for several reasons.

First, the method says nothing about the probabilities that rates will rise above and fall below 1.10%. In the very special case in which only two rates are possible, say 1% and 1.25%, the only way to get an expected rate of 1.10% is if the probability of a 1% rate is 60% and the probability of a 1.25% rate is 40%. But, in the more general case, where more than two rate realizations are possible, there is no way to determine the probabilities of each rate outcome from the expected rate alone.

Second, changes in Fed fund futures rates reveal nothing directly about expected Eurodollar rates or the probabilities of various Eurodollar rates. This is a significant weakness because, particularly for maturities greater than a few months, trades are often more difficult to execute through Fed funds contracts than through Eurodollar futures or Eurodollar futures options. A Eurodollar is a dollar-denominated deposit in a non-U.S. bank. The Eurodollar deposit rate is the interest rate on these deposits. The Eurodollar offer rate refers to the rate paid for a dollar-denominated loan from a non-U.S. bank. Like any other borrowing or lending rate, quoted Eurodollar rates vary across banks. When a single Eurodollar rate is referred to, it is usually an average of quoted rates from large banks in the international money market centered in London. Eurodollar rates are quoted for standard maturities of one month, three months, one year, etc. LIBOR is an example of particular Eurodollar rate. LIBOR is an acronym for the London interbank offer rate. It is the rate that large non-U.S. banks charge other large non-U.S. banks for dollar-denominated loans. The LIBOR rate incorporates a risk premium due to political and credit risk and is usually slightly higher than the Fed funds rate.

Third, as explained below, some of a 10 bp (a basis point (bp) is $1/100$ of a percentage point) increase in the Fed funds futures rate is due to the interest rate risk premium rather than to any increase in the expected Funds rate. In fact, if this risk premium were estimated at 20 bp per year, a 10 bp increase over 6 Fed fund futures contracts would indicate approximately no change at all in the expected funds rate.

Other popular ways of backing out market views from prices suffer from similar drawbacks. Calculations using Eurodollar futures rates alone cannot provide a full probability distribution, cannot directly produce views about Fed funds, and must be adjusted for the interest rate risk premium. More sophisticated calculations that make use of Eurodollar futures options can, with care, provide full probability distributions for Eurodollar rates, but the problems of translation to Fed funds rates and of adjusting for the risk premium remain.

SUMMARY

The FEDISCOPE, comprised in a preferred embodiment of the present invention, overcomes the shortcomings of the above and similar approaches by using information in several markets simultaneously. In particular, as detailed below, the FEDISCOPE uses Eurodollar futures options to determine the probability distributions of Eurodollar rates; Fed funds versus LIBOR basis swaps (basis swaps are floating rate/floating rate interest rate swaps; the contracted parties to a basis swap exchange floating rate interest payments on a notional amount referenced to two different bases over a defined period) to link Eurodollar rates to overnight forward Fed funds rates; and an estimate of the risk premium to link forward Fed funds rates to expected Fed funds rates. One purpose of the FEDISCOPE is to extract probability distributions of the Fed funds target rate on future dates from prices of various fixed income securities.

Additional Terminology:

Fed fund futures: The final cash settlement price of these contracts is the average overnight Fed funds effective rate, as reported by the Federal Reserve Bank of New York, over the delivery month. Positions are marked to market daily. There is a contract maturing each month, but liquidity declines with maturity.

Eurodollar futures: The final cash settlement price of these contracts is based on 3-month LIBOR. Positions are marked to market daily. The most liquid contracts expire in the third week of March, June, September, or December. The maturity can be as long as ten years, but liquidity declines with maturity.

Fed funds versus LIBOR basis swaps: At the end of each quarter, one party pays average Fed funds effective over that quarter plus the basis swap spread and receives 3-month LIBOR set at the beginning of that quarter. Maturities extend to ten years, but, once again, liquidity declines with maturity.

The FEDISCOPE is a tool that: (1) uses the prices of short-term fixed income securities to infer the probability distributions of the Fed funds target rate at various future dates; and (2) identifies relative value trades arising from differences between personal views about these probabilities and those implied by market prices. The FEDISCOPE has several advantages over more common but less rigorous approaches to extracting consensus views from market prices. First, the FEDISCOPE uncovers not only the expected Fed funds target rate but also its entire probability distribution. Second, the FEDISCOPE combines, in an internally consistent manner, prices from all of the following markets: Fed fund futures, Eurodollar futures, Fed fund versus LIBOR basis swaps, and options on Eurodollar futures. Third, the FEDISCOPE adjusts market prices so that the interest rate risk premium is not mistakenly interpreted as an expectation of a rising Fed funds target rate.

After determining the probability distributions of Fed funds rates implied by market prices, a second function of the FEDISCOPE may come into play. A user's subjective probabilities may be used to calculate new prices for Fed fund futures, Eurodollar futures, and Eurodollar futures options. The differences between these new prices and market prices represent relative value opportunities if the user's probabilities are, in fact, more accurate representations of reality than those implied by market prices.

In various aspects, the invention provides methods and systems of predicting interest rates. In one aspect, the invention comprises a computer-implemented method for predicting interest rates. The method comprises the steps of: electronically receiving data describing one or more Fed fund futures rates; electronically adjusting the data describing the one or more Fed fund futures rates to obtain adjusted data regarding the one or more Fed fund futures rates; and electronically determining data regarding one or more expected Fed fund target rates, wherein an expected rate is determined for each of one or more future Fed meetings contemplated and the data regarding the one or more expected target rates is consistent with the adjusted data regarding the one or more Fed fund futures rates.

In various embodiments: (1) the step of electronically adjusting the data describing the one or more Fed fund futures rates accounts for an estimated interest rate premium; (2) the estimated interest rate premium is based on an assumption of a constant risk premium per unit of time; (3) the estimated interest rate premium is based on one or more market prices; and (4) the one or more Fed fund futures rates are limited to a time period not exceeding an expiration month of a pre-determined number of Eurodollar contracts.

In another embodiment, the above computer-implemented method for predicting interest rates further comprises electronically receiving data regarding Eurodollar futures. In yet another embodiment the data regarding the Eurodollar futures comprises data regarding one or more futures rates and one or more futures dates, and the method further comprises calculating one or more forward Fed fund to Eurodollar spreads corresponding to one or more Eurodollar futures dates.

In various embodiments: (1) the step of calculating forward Fed fund to Eurodollar spreads corresponding to Eurodollar futures dates comprises approximating a forward spread; (2) the approximating step comprises subtracting an average Fed funds rate over a Eurodollar period from a risk-adjusted Eurodollar rate over that period and (3) the step of calculating forward Fed fund to Eurodollar spreads corresponding to Eurodollar futures dates further comprises calculating 3-month basis swap data.

In another aspect, the invention comprises a system for predicting interest rates. The system comprises: one or more processors operable to determine probability distribution data for one or more Eurodollar rates based on Eurodollar futures option data; one or more processors operable to link said probability distribution data for one or more Eurodollar rates to overnight forward Fed funds rate data; and one or more processors operable to link said forward Fed funds rate data to expected Fed funds rate data.

In various embodiments: the probability distribution data for Eurodollar rates is linked to overnight forward Fed funds rate data based on data regarding Fed funds versus LIBOR basis swaps; (2) the forward Fed funds rate data is linked to expected Fed funds rate data based on data regarding an interest rate risk premium; (3) the data regarding the interest rate risk premium is based on one or more market prices; (4) the data regarding the interest rate risk premium is based on one or more market prices via an assumption that market expectations of rate changes will die out after a pre-determined number of years; (5) the rate risk premium is assumed to be constant per unit of time; (6) the rate risk premium is estimated from a slope of a Eurodollar futures curve over a pre-determined period of time; and (7) the system further comprises one or more processors operable to enable a user to input one or more subjective probabilities to be used for calculating one or more terms for one or more of: Fed fund futures, Eurodollar futures, and Eurodollar futures options.

BRIEF DESCRIPTION OF THE DRAWINGS

FIG. 2 depicts an exemplary preferred display comparing market data to internal pricing model prices.

FIG. 3 depicts an exemplary preferred display of predicted probability distribution values.

FIG. 4 depicts an exemplary display of re-calculated probability distribution values.

DETAILED DESCRIPTION OF PREFERRED EMBODIMENTS

Figure 1:
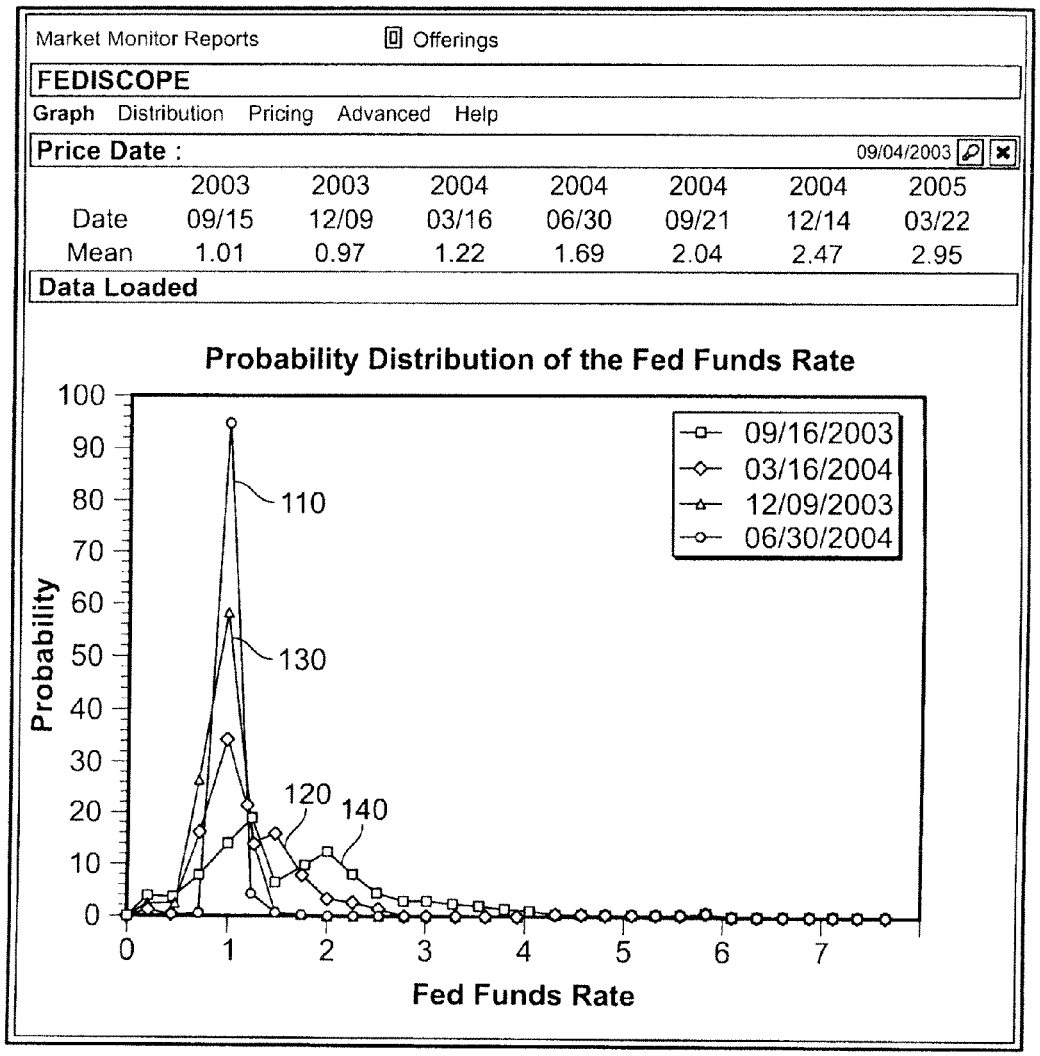
FIG. 1 depicts an exemplary preferred display of a predicted probability distribution of the Fed funds rate.

FIG. 1 depicts an exemplary display of output of the FEDISCOPE based on market data as of Sep. 4, 2003. The row labeled "Date" gives the dates of selected FOMC meetings. The row labeled "Mean" gives the FEDISCOPE's calculation of the expected target rate emerging from each of those meetings. So, for example, the expected target rate to be set at the Mar. 16, 2004, meeting is 1.22%. The vertical axis of the graph gives probability and the horizontal axis gives the target rate. The graph 110 corresponding to the Sep. 16, 2003, meeting, for example, shows that the perceived probability that the Fed funds rate will remain at 1% at that meeting is above 95%. By the Mar. 16, 2004, meeting (see graph 120), however, the probability distribution has flattened considerably so that there is only a 34% chance of the Fed funds remaining unchanged at 1%. Note that the lines connecting the solid squares are for visual purposes only: all of the probability for each date is contained in these squares. See FIG. 1.

As described below, the FEDISCOPE tries to find smooth probability distributions that fit market prices, particularly the prices of Eurodollar futures options. Operationally, the FEDISCOPE accepts the smoothest distribution that fits options prices with an accuracy of ½ bp (for this purpose, accuracy is defined in terms of root mean square error). The bumpiness of the distribution 140 corresponding to Jun. 30, 2003, in FIG. 1 shows that the FEDISCOPE could not find a smoother distribution that generated an acceptable fit to option prices.

The FEDISCOPE reports probability distributions only for meeting dates near Eurodollar futures option expiration dates. While the FEDISCOPE preferably internally generates probability distributions on all meeting dates, those near option expiration dates are substantially less sensitive to model assumptions than those on other meeting dates. The reason for this will become clear in the description below.

Since probabilities are extracted from options prices, there is a possibility that the tails of the probability distribution, i.e., the amount of probability at rates far from the mean, are exaggerated by the reluctance of market participants to sell out-of-the-money options. Most investors and traders simply do not like the payoff profile of receiving a relatively small amount of money today, paying nothing with a large probability, and paying a great deal with some small probability. As a result, out-of-the-money options may trade at prices above their arbitrage-free prices and, consequently, raise the implied probabilities of the tails above the levels truly reflective of market opinion.

Another FEDISCOPE output, reproduced as FIG. 2, reports market data and compares them with prices from the FEDISCOPE's internal pricing model, which uses the probabilities shown in FIG. 1. The upper left box 210 gives Fed fund futures market rates, model rates, and an error or relative value indicator. The middle left box 220 gives the same information for Eurodollar futures, along with an estimate of the forward LIBOR versus Fed funds basis for each contract. Note that all of the futures contracts except FFV3 are fit quite well by the model. As explained below, given the model's assumption that the Fed funds rate moves only on meeting dates, it often happens that not all Fed fund contracts can be fit simultaneously.

The upper right box 230 contains the market prices of Fed funds versus 3-month LIBOR basis swaps used by the model as described below. The middle right box 240 is the model's assumption of the interest rate risk premium for that day. A value of 13 says that the market demands 13 bp of expected return per year for bearing a year of duration risk. The risk premium is discussed at length below.

The bottom portion 250 of FIG. 2, which truncates the on-line output, gives market and model prices for Eurodollar futures options. The options here are those that expire on the same date as their underlying Eurodollar futures contract. The market prices in bold are those used by the model for determining the probability distributions of Fed funds. While the fit is usually quite good, there can be options appearing more than a cent cheap or rich. In this example, options on EDZ3 are not fit as well as options on EDU3 and EDH4.

The FEDISCOPE outputs a table of the probability distributions of the Fed funds rate on meeting dates, that is, the numbers from the graphs in FIG. 1. The tabular representation may be of interest to some users, and values may be downloaded by clicking on the Excel icon. But this page also allows users to input their own subjective probabilities, compute security prices assuming these probabilities, and look for relative value.

An example of this is illustrated in FIG. 3. The row labeled "mean" at the top of the table gives the expected Fed funds rate at the various meeting dates before any user changes to the probabilities. For example, the expected Fed funds rates after the Jun. 30, 2004, meeting is 1.69%. The shaded boxes 310 indicate that the probability distribution as of the Jun. 30, 2004, meeting was changed from the one portrayed in FIG. 1 to a 20% probability for each of the outcomes from 1% to 2%. Clicking on the GO button in the lower right hand corner of the web page (not shown in the figure), instructs the FEDISCOPE to re-compute security prices. (If necessary, probabilities are scaled so as to sum to 1.)

FIG. 4 shows the output of the FEDISCOPE after this change in probabilities. Recall from FIG. 2 that under the original probabilities, the model prices of all Eurodollar futures, including EDM4, equal their market prices. The new probabilities, however, lower the expected rate after the Jun. 30, 2004, meeting from 1.69% to 1.50%. Therefore, as shown in FIG. 4, the EDM4 rate produced by the model is over 16 bp below the market rate. This means that a user who truly believes the new probabilities—that is, the new probabilities for the Jun. 30, 2004, meeting and the original probabilities for other meetings—might consider buying EDM4 and selling surrounding Eurodollar contracts. Note, by the way, that Eurodollar contracts aside from EDM4 have been affected by the change in Jun. 30, 2004, probabilities. Because of the way the FEDISCOPE links probabilities from one meeting date to the next, changes in the distribution on one date do affect the distributions on surrounding dates.

FIG. 4 also shows that calls on EDM4 with strikes of 97.75 and above have become rich as a result of the change in probabilities, while calls with strikes of 97.25 and 97.50 have become cheap. Intuitively, the new probability distribution eliminated the possibility of the Fed fund rates' rising above 2% by putting more probability on lower rates. Therefore, the 97.25 and 97.50 calls, which have value when Eurodollar rates are below 2.75% and 2.50%, are worth more under the new probabilities. Lower strike calls, which have value when Eurodollar rates are particularly high, are worth less. A user believing in these new probabilities can construct an attractive portfolio of these options.

Since 1994, Alan Greenspan has attempted to increase the transparency of Fed activity by changing the Fed funds target rate only after regularly scheduled meetings of the FOMC. There have been only five inter-meeting target rate changes since this attempt at transparency, three in response to stronger- or weaker-than-expected economic data and two in response to perceived systemic risks to the financial system (Oct. 15, 1998, and Sep. 17, 2001). As a result, the market has come to believe that inter-meeting moves are exceptions to a relatively reliable rule. In this spirit, the FEDISCOPE assumes that the Fed funds rate may change only at scheduled FOMC meetings.

Relying on this assumption, the FEDISCOPE finds the expected change in the target rate on each meeting date, or the expected path of the target rate, consistent with the pricing of various fixed income securities. Simplifying the method for expository purposes, the example below illustrates one way in which the FEDISCOPE may extract the expected path using market prices as of Jul. 15, 2003.

Table 1 lists FOMC meeting dates and market data as of this pricing date. Note that the securities used are Fed fund (FF) futures, Eurodollar (ED) futures, and Fed fund versus 3-month LIBOR basis swaps. The basis swap spreads listed in the table are the number of basis points added to the Fed funds side of the swap.

The data in Table 1 are essentially sufficient to recover the path of Fed funds from the pricing date through the middle of March 2004. While this horizon is adequate for the expository purposes of this example, a FEDISCOPE run as of Jul. 15, 2003, would use additional Eurodollar futures rates and basis swap spreads to recover the path of Fed funds out 2 years.

TABLE 1

Market Data as of Jul. 15, 2003

| FOMC Meeting Dates | FF Futures Contract | FF Futures Rate | ED Futures Contract | ED Futures Rate | Basis Swap Maturity | Basis Swap Spread (bp) |
|---|---|---|---|---|---|---|
| Aug. 12, 2003 | FFN3 (Jul) | .995 | EDU3 (Sep) | 1.085 | 3 m | 13.0 |
| Sep. 16, 2003 | FFQ3 (Aug) | .985 | EDZ3 (Dec) | 1.145 | 6 m | 14.5 |
| Oct. 28, 2003 | FFU3 (Sep) | .955 | | | 9 m | 14.5 |
| Dec. 09, 2003 | FFV3 (Oct) | .938 | | | | |
| Jan. 28, 2004 | FFX3 (Nov) | .92 | | | | |
| Mar. 16, 2004 | FFZ3 (Dec) | .92 | | | | |

As will become clear in the course of the calculations, Fed fund futures are more convenient than Eurodollar futures for extracting the expected path of the target rate. First, since the FOMC meets about every six weeks, there is at most one meeting over periods covered by monthly Fed fund futures, while there are often two meetings over periods covered by quarterly Eurodollar futures. This means that Fed fund futures allow the FEDISCOPE to distinguish the effect of each meeting date, while Eurodollars often identify only the average effect over two meetings. Second, while Eurodollar futures rates must be adjusted by the Fed fund versus LIBOR basis swap curve before they can be used to deduce anything about the Fed fund target rate (see below), Fed fund futures, by definition, require no such adjustment.

Although Fed fund futures are more convenient than Eurodollar futures for the purposes of the FEDISCOPE, they are not as liquid, particularly at longer maturities. As a compromise, the FEDISCOPE considers Fed fund futures up to the expiration month of the second Eurodollar contract. Since, as of Jul. 15, 2003, the second contract expires in December, and since there is an FOMC meeting in December, the FEDISCOPE uses Fed Fund futures through and including December.

The first step in finding the expected path of the target rate is to adjust Fed fund futures rates down for the interest rate risk premium. The description below explains the concept of the risk premium and how its size is estimated. For now, simply note that the adjustment to Fed funds used by the FEDISCOPE is approximately equal to the time to the middle of the contract month times the estimated risk premium. As of Jul. 15, 2003, the estimated risk premium was 19 bp per year. So, for example, since Oct. 1, 2003, is 78 days from Jul. 15, 2003, and Oct. 31, 2003, is 107 days from Jul. 15, 2003, the risk premium adjustment is approximately [0.5×(78+107)/365]×19=4.8 bp. Starting with the market rates from Table 1, the fourth column of Table 2 gives the rates adjusted by the risk premium for several contracts.

The second step is to find the expected target rates, one for each meeting, that are consistent with the adjusted Fed fund futures rates. Table 2 illustrates this step. Starting with the target rate as of the pricing date, that is, 1.00% on Jul. 15, 2003, what target rate emerging from the Aug. 12, 2003, meeting is consistent with an adjusted August futures rate of 0.9683%? The answer is 0.9483% because $$\frac{1\% \times 12 + .9483\% \times 19}{31} = .9683\% \quad (1)$$

That is, the August futures rate is composed of 12 days at the initial rate of 1% and 19 days at the expected rate as of Aug. 12, 2003. Similarly, the Fed funds target rate set at the Sep. 16, 2003 meeting is 0.8929% because of the appropriated weighted average of the rate set in August and this 0.8929% equals the adjusted September Fed fund futures rate:

$$\frac{.9483\% \times 16 + .8929\% \times 14}{30} = .9225\% \quad (2)$$

Note that, consistent with the morning clearing of the money markets and the early afternoon announcement of FOMC policy changes, a new target rate is assumed to take effect the day after the announcement. Continuing in this fashion, Table 2 calculates the target rate emerging from each of the subsequent meetings.

TABLE 2

The Expected Path of the Target Rate from Adjusted Fed Fund Futures Rates

| Meeting Date | Fed Fund Target | Fed Fund Futures Contract Month | Adjusted Futures Rate |
|---|---|---|---|
| Pricing Date | 1.00% | | |
| Aug. 12, 2003 | .9483% | FFQ3 (August) | .9683% |
| Sep. 16, 2003 | .8929% | FFU3 (Sepember) | .9225% |
| Oct. 28, 2003 | .8557% | FFX3 (November) | .8557% |
| Dec. 9, 2003 | .8333% | FFZ3 (December) | .8398% |

Table 2 reveals that the FEDISCOPE does not necessarily use each and every Fed fund futures contract. The July contract is not used since, with the pricing date on Jul. 15, 2003, and the next meeting date on Aug. 12, 2003, the July contract contains no information about any meeting outcome. The October contract is not used for a different reason. Given that the outcomes of the August and September meetings have been inferred from the August and September futures contracts, the rate set at the October meeting may be inferred from either the October contract or the November contract. Furthermore, since the outcome of this Oct. 28, 2003, meeting affects the entire length of the November contract but only three days of the October contract, the November contract will be much more sensitive than the October contract to the outcome of the October meeting. Therefore, the FEDISCOPE uses the November contract to back out the target rate in October. Note that as a result of these choices, the June and October contract rates will not be matched exactly by the FEDISCOPE.

Given the compromise to use Fed fund futures only through December, Eurodollar futures are used to extract the expected path of the target rate beyond that month. In preparation for this, the third step in the process is to find forward Fed funds versus LIBOR spreads so as to connect information from these Eurodollar futures with the path of Fed funds. Since basis swap quotations maturing every three months in the short end are generally available, evenly spaced, 3-month forward Fed funds versus LIBOR spreads could be calculated. However, for the purposes of the FEDISCOPE, it is more convenient to calculate forward spreads corresponding to Eurodollar futures dates. This forward spread convention allows for a simple breakdown of Eurodollar futures rates into the expected path of Fed funds, risk premium, and a forward Fed funds versus LIBOR spread.

Since the FEDISCOPE matches both Fed fund and Eurodollar futures rates covering the first Eurodollar period (EDU3 in this example), the forward spread over this particular period may be determined directly from futures rates (that is, without reference to the basis market). Specifically, this forward spread may be approximated by subtracting the average Fed funds rate over the Eurodollar period from the risk-adjusted Eurodollar rate over that period. The 91-day EDU3 period from Sep. 17, 2003, to Dec. 17, 2003, may be divided into 42 days at the 0.8929% rate set on Sep. 16, 2003, 42 days at the 0.8557% rate set on Oct. 28, 2003, and 7 days at the 0.8333% rate set on Dec. 9, 2003. Furthermore, adjusting the EDU3 rate of 1.085% down for 5.7 bp of risk premium gives an adjusted rate of 1.028%. Putting all this together and denoting the forward basis spread by $b_{EDU3}$, $$b_{EDU3} \approx 1.028\% - \frac{42 \times .8929\% + 42 \times .8557\% + 7 \times .8333\%}{91} \quad (3)$$
$$\approx .157\%$$

Having found the forward basis for the EDU3 period, the 3-month basis swap may be used to find the stub basis (i.e., the forward basis corresponding to the period from the pricing date to the start of the EDU3 period). The 3-month basis swap exchanges only one payment: 3-month LIBOR versus average realized Fed funds over the three months plus the basis swap spread of 13.0 bp (reported in Table 1). In the FEDISCOPE, 3-month LIBOR is formed by compounding Fed funds plus a risk premium plus a forward basis spread, while average realized Fed funds, for the purpose of pricing securities, is formed by taking the average of expected Fed funds plus a risk premium. Hence, ignoring the compounding of Fed funds in LIBOR and assuming that the risk premium cancels from both sides of the swap, an approximation to the stub basis, $b_{STUB}$, may be found by setting the weighted average of the stub and EDU3 bases over the 3-month LIBOR period equal to the 3-month basis swap spread of 13 basis points. Mathematically, with the 92 days of 3-month LIBOR divided as 62 days of a stub basis (from the settle of the 3-month basis swap on Jul. 17, 2003 to the start of the EDU3 forward basis period on Sep. 17, 2003) and 30 days of the EDU3 basis, $$\frac{62 \times b_{STUB} + 30 \times .157}{92} = .13 \quad (4)$$

Solving, $b_{STUB}$=0.117%. Taking proper account of compounding lowers the result slightly, to 11.5 basis points.

The fourth and final step is to find the outcome of the Jan. 28, 2004, meeting and the forward basis spread for EDZ3 that are consistent with the pricing of EDZ3 and of the 9-month Fed-fund versus LIBOR basis swap. The FEDISCOPE satisfies these conditions simultaneously, but, for the purposes of this example, the following approximations provide the necessary intuition. Assume that a basis swap maturing on Mar. 17, 2004, the end of the EDZ3 period, trades at a weighted average of the 6- and 9-month basis swaps. In particular, since Table 1 reports that both of these swaps trade at 14.5 bp, assume that a basis swap to Mar. 17, 2004 trades at 14.5 bp. Then, this basis swap spread may be viewed as a blend of the following bases: the stub basis from the settlement of the basis swap on Jul. 17, 2003, to Sep. 17, 2003 (62 days), the EDU3 forward basis from Sep. 17, 2003, to Dec. 17, 2003 (91 days), and the EDZ3 forward basis from Dec. 17, 2003, to Mar. 17, 2004 (91 days). Given the basis swap spread of 14.5 bp to Mar. 17, 2004 and the previously computed forward basis spreads, the forward basis for EDZ3, $b_{EDZ3}$, may be approximated by the following equation:

$$\frac{62 \times 11.5 + 91 \times 15.7 + 91 \times b_{EDZ3}}{244} = 14.5 \quad (5)$$

Solving, $b_{EDZ}$ equals 15.3 bp.

Finally, the outcome of the Jan. 28, 2004, meeting that is consistent with the pricing of EDZ3 can be found by setting the appropriate weighting of the expected target rates plus the EDZ3 forward basis equal to the risk-adjusted Eurodollar futures rate. Letting r be the target rate emerging from the Jan. 28, 2004, meeting, we get:

$$\frac{43 \times .8333\% + 48 \times r}{91} + .153\% = 1.145\% - .1044\% \quad (6)$$
$$r = .9362\%$$

This last calculation was particularly straightforward because the outcome of only one meeting, namely that on Jan. 28, 2004, is needed to determine EDZ3. To clarify, since EDZ3 covers the period Dec. 17, 2003, to Mar. 17, 2004, and since the subsequent FOMC meeting on Mar. 16, 2004 does not alter the target rate until Mar. 17, 2004, that subsequent meeting has no effect on EDZ3. In general, however, there may very well be two meetings over a particular Eurodollar futures period. This creates a problem because only one expected change can be determined from one new Eurodollar futures rate. Having to make some extra assumption in these cases, the FEDISCOPE assumes for simplicity that the outcome of the two meetings in the same Eurodollar futures period is the same.

Understanding the relationship between market prices or rates and the expected path of rates requires an understanding of the interest rate risk premium. Consider the following question: If the current overnight rate were 3% and everyone in the market thought that it would remain at 3%, on average, over the next two years, what would the 2-year rate be? The widely accepted answer is that the 2-year rate would have to be greater than 3%. If an investor can earn an average of 3% by rolling overnight money, why take the duration risk of a 2-year note earning 3%? Investors need to be paid an extra yield to accept the duration risk of the 2-year security. This reasoning implies that even if the expected path of the overnight rate is flat, the observed yield curve will be upwardsloping. More generally, the slope of the observed yield curve overestimates the expected change in the overnight rate.

The FEDISCOPE makes a simple assumption about how the risk premium affects bond prices—namely, that investors demand a constant premium in expected return per unit of duration risk. For example, if the risk premium were 20 bp per year, then a switch of securities that increases duration by 1 year will increase expected return by 20 bp per year.

Under this simple assumption about the risk premium, there is a simple relationship between the expected path of rates and the path of rates implicit in market prices. See Bruce Tuckman, FIXED INCOME SECURITIES: TOOLS FOR TODAY'S MARKETS, ch. 10 (2d. ed. 2002) (hereinafter Tuckman 2002; the contents of the entire book are incorporated herein by reference). Continuing with an overnight rate of 3% (expected to remain at 3%) and a risk premium of 20 by per year, the overnight rate at time t (in years) implied by market prices will be 3% plus 20 by multiplied by t. So, for example, the implied rate in 9 months will be 3% plus 20 by times ¾, or 3.15%, while the implied rate in 1 year will be 3.20%. In terms of security prices this means, for example, that the rate of a Eurodollar futures contract expiring nine months from today, essentially the average of implied overnight rates from nine months to one year, will be approximately 3.175%. This is a particular feature of futures rates as opposed to forward rates. See Tuckman 2002, chs. 16-17. To summarize the lesson of this example, a risk premium of 20 by per year and a 9-month Eurodollar futures rate of 3.175% indicate that the expected 3-month rate nine months from today is not 3.175%, but 3%.

Having clarified the role of the interest rate risk premium in the FEDISCOPE, this description turns to estimating the risk premium. One procedure is to compute the historical average return of a fixed income security or portfolio with a particular duration, subtract the overnight rate, and divide the result by the duration. This gives the average return earned per unit of duration risk over a particular time period. A more sophisticated procedure along the same lines uses a term structure model to link the prices of bonds to one another so that histories of all traded bonds can be used in the estimation. These estimation procedures suffer from the same drawbacks as any historical analysis. First, the results are quite dependent on the selected time period. Second, it is difficult to determine which historical time period is most relevant for today's market.

Consistent with the spirit of extracting as much information as possible from market prices, the FEDISCOPE estimates the risk premium from market prices rather than from historical data, preferably by relying on the following strong assumption: market expectations of rate changes die out after about eight years. In other words, the market expectation of the 3-month rate in eight years is the same as the market expectation of the 3-month rate in nine years, which is also the same as the market expectation of the 3-month rate in ten years. While many market participants find this assumption reasonable, it does rule out long-term business cycle effects, which may very well be significant.

Under the assumptions of a constant risk premium per unit of duration and of expectations dying out after eight years, the risk premium can be estimated from the slope of the last two years of the Eurodollar futures curve. Intuitively, since Eurodollar futures rates approximately equal expected rates plus a risk premium and since rate expectations do not change from years 8-10, the only determinant of the slope of the last eight contract rates is the risk premium. To avoid problems arising from the relative illiquidity of these long-dated futures contracts, the FEDISCOPE estimates the risk premium by calculating the seven differences between adjacent contracts, taking the median, and multiplying by four.

The implied measure of the risk premium described in the previous paragraph has historically fluctuated between 10-20 bp per year, with an average just under 15. As it happens, on Jul. 15, 2003, the date of the subject example, the risk premium was above this average, at 19 bp.

Because Fed fund futures markets do not extend very far in maturity, the FEDISCOPE also relies on Eurodollar futures and Eurodollar futures options markets. But deriving expectations about the Fed funds target rate from Eurodollar futures markets requires an understanding of the quantitative relationship between the Fed funds rate and 3-month LIBOR. As it turns out, the Fed funds versus LIBOR basis swap market provides this link.

If there were no credit risk in the Fed funds or LIBOR markets, investors would be indifferent between rolling a loan at overnight Fed funds for three months and lending at 3-month LIBOR. Without credit risk, this indifference is precisely the definition of a 3-month rate, or, put another way, the 3-month rate is determined such that investors are indifferent between these alternatives. In terms of basis swaps, were there no credit risk in Fed funds or LIBOR, daily compounded Fed funds would trade flat against 3-month LIBOR. For the purposes of this discussion, the text refers to compounded Fed funds, but traded basis swaps exchange average Fed funds for LIBOR.

In reality, Fed funds have overnight credit risk, while 3-month LIBOR has 3-month credit risk. If overnight Fed funds did compound to 3-month LIBOR, then all investors would prefer lending in the Fed funds market: without any return advantage, it is better to roll over loans daily, with the option to stop lending if credit conditions deteriorate, than to commit to a 3-month loan. Hence, given the credit risk in these markets, Fed funds will compound to a rate less than 3-month LIBOR. In terms of basis swaps, Fed funds plus some spread will be fair against 3-month LIBOR. For a more detailed discussion of the source of money market basis swap spreads, see B. Tuckman and P. Porfirio, *Interest Rate Parity, Money Market Basis Swaps, and Cross-Currency Basis Swaps*, LIQUID MARKETS RESEARCH QUARTERLY, June 2003, Lehman Brothers (hereinafter Tuckman 2003; the contents of the entire article are incorporated herein by reference).

For the purposes of the FEDISCOPE, the existence of basis swap spreads means that Eurodollar rates are not directly comparable to Fed fund rates. More specifically, as illustrated in equation (6), Eurodollar futures rates may be compared with average Fed funds only after a spread consistent with the pricing of basis swaps is added to average funds.

The FEDISCOPE preferably relies heavily on Eurodollar futures options to find the probability distributions of Fed funds around the averages calculated above. The description below presents a simplified example of how this is done, and briefly discusses the ways in which the inner workings of the FEDISCOPE differ from this simplified description.

Table 3 lists prices of call options on EDZ3 as of Jul. 15, 2003. All options are December options (that is, options that mature on the day EDZ3 expires). While these particular options were chosen for purposes of illustration, the FEDISCOPE uses certain rules to select the most actively traded call or put options.

TABLE 3

Selected December Call Option Prices on EDZ3

| Strike Price | Strike Rate | Call Price |
|---|---|---|
| 99.25 | .75% | .013 |
| 99.00 | 1.00% | .048 |
| 98.75 | 1.25% | .155 |
| 98.50 | 1.50% | .365 |
| 98.25 | 1.75% | .605 |
| 98.00 | 2.00% | .855 |

The first step in finding a probability distribution of Fed funds rates consistent with these Eurodollar futures options is to choose the support of Fed funds rates (i.e., the set of Fed funds rates that occur with a probability greater than zero). For the purposes of this illustration, assume that this support consists of the 9 Fed funds rates, in 25 bp increments, from 0% to 2%.

The second step is to map each of the possible Fed funds rates into a Eurodollar futures rate. For the purposes of this illustration, the mapping will be very simple. In particular, for a given Fed funds rate, the associated Eurodollar futures rate is determined by the Fed funds rate, the expected change in the Fed funds rate, the LIBOR versus Fed fund forward basis, and a risk premium. Note that a risk premium must be included since the Fed funds rate is interpreted as an actual future realization of Fed funds, while the Eurodollar futures rate will be used for option pricing.

For a numerical example of this Fed funds-Eurodollar mapping, assume a Fed funds rate of 1.25%. According to the findings discussed above, the Fed funds rate expected to be realized on Jan. 28, 2004 (0.9362%) is approximately 10.3 bp above the rate expected to be realized on Dec. 9, 2003 (0.8333%); the LIBOR versus Fed funds forward basis for EDZ3 is 15.3 bp; and the risk premium for EDZ3 is 10.44 bp. Therefore, the EDZ3 rate corresponding to a Feds fund rate of 1.25%, $r_{1.25\%}$, is given by the following equation, $$\left(1 + \frac{1.25\% + .153\% + .1044\%}{360}\right)^{43} \quad (7)$$
$$\left(1 + \frac{1.353\% + .153\% + .1044\%}{360}\right)^{48} = 1 + \frac{91 r_{1.25\%}}{360}$$

Solving, $r_{1.25\%}$=1.565%. Note that the Fed funds rate of 1.353% in the second term reflects the scenario Fed funds rate of 1.25% and the 10.3 bp average change as a result of the Jan. 28, 2004, meeting. The second and third columns of Table 4 list the possible Fed funds rates as of the expiration of EDZ3 and their associated EDZ3 rates.

The third and final step is to find the set of probabilities that price EDZ3 options, subject to the constraints that the probabilities sum to 1 and that they also price EDZ3 itself. Table 4 may be used to illustrate this process. Given the EDZ3 rates computed in the previous step, the fourth through ninth columns of the table record the payoffs to call options at various strikes for each of those EDZ3 rates. For example, the EDZ3 98.25 call has a rate strike of 1.75%. If the final rate settle of EDZ3 is 1.314%, corresponding to a price of 98.686, that option's payoff is 98.686 minus 98.25, or 0.436.

TABLE 4

Solving for the Probability Distribution

| | | EDZ3 | Call Option Strike (in Rate) | | | | | |
|---|---|---|---|---|---|---|---|---|
| Probability | Fed funds | Rate | .75% | 1.00% | 1.25% | 1.50% | 1.75% | 2.00% |
| 0.53% | 2.00% | 2.318% | 0.000 | 0.000 | 0.000 | 0.000 | 0.000 | 0.000 |
| 0.00% | 1.75% | 2.067% | 0.000 | 0.000 | 0.000 | 0.000 | 0.000 | 0.000 |
| 1.53% | 1.50% | 1.816% | 0.000 | 0.000 | 0.000 | 0.000 | 0.000 | .184 |
| 2.79% | 1.25% | 1.565% | 0.000 | 0.000 | 0.000 | 0.000 | 0.185 | .435 |
| 43.52% | 1.00% | 1.314% | 0.000 | 0.000 | 0.000 | 0.186 | 0.436 | .686 |
| 33.94% | .75% | 1.063% | 0.000 | 0.000 | .187 | 0.437 | 0.687 | .937 |
| 14.70% | .50% | .813% | 0.000 | 0.188 | .438 | 0.688 | 0.938 | 1.188 |
| 0.02% | .25% | .562% | 0.188 | 0.438 | .688 | 0.938 | 1.188 | 1.438 |
| 2.97% | .00% | .312% | 0.438 | 0.688 | .938 | 1.188 | 1.438 | 1.688 |
| Price | | 1.145% | 0.013 | .048 | .155 | .365 | .607 | .853 |

The probabilities that are consistent with the pricing of EDZ3 and EDZ3 options are given in the first column of Table 4. It is easily verified that these probabilities sum to 1. Also, the Eurodollar futures rate, defined as the probability-weighted average of the EDZ3 rates in the table (see Tuckman 2002, pp. 347-50), is easily verified to be the market rate of 1.145%. Finally, it can be verified that the probabilities in Table 4 also price EDZ3 options quite well. The discount factor to the expiration date, which can be calculated from the path of the fed funds rate, is 0.99596. Also, Table 4 gives the probability of each EDZ3 rate outcome along with the option payoffs at each rate outcome. Therefore, weighting each outcome by its probability of occurrence and discounting, the EDZ3 99 call, for example, is worth approximately $$[14.70\% \times 0.188 + 0.02\% \times 0.438 + 2.97\% \times 0.688] \times 0.99596 = 048 \quad (8)$$

This model price is, to the precision shown, equal to the market price given in Table 3. Note that (8) is an approximation because the option price should be calculated as the expected discounted payoff, not the discounted expected payoff. See Tuckman 2002, pp. 350-51. The FEDISCOPE preferably does the former.

In conveying the intuition behind the FEDISCOPE's extraction of probability distributions, the previous description ignores certain details about preferred assumptions and calculations of the FEDISCOPE. The description below provides those details.

The choice of the support of the Fed funds rate probability, distribution turns out to be a crucial determinant of the shape of the probability distribution. Because a limited number of option strikes, usually those closest to at-the-money, trade actively, it is tempting to restrict the support to rates corresponding to those strikes. However, to the extent that there is a significant true probability of rates being realized outside this strike range, it arguably would be a mistake to restrict the support in this way. In fact, the odd shape of the probability distribution in Table 4 at rates 1.50% and higher is due to an overly restrictive support. Specifically, the truncation of the support at 2% is the reason probabilities first decline (from 1.53% to 0%) and then increase (to 0.53%) as rates increase from 1.50% to 2%. If the Fed funds rate were allowed to rise above 2% while preserving both the expected Fed funds rate (so as to price Eurodollars and Fed fund futures correctly) and the probabilities of rates below 1.50% (so as to price high-strike Eurodollar calls correctly), the probability of rates 2% and higher would be smaller than 0.53%. Hence, some positive probability of rates being at 1.75% could be supported. Furthermore, if the resulting distribution were to conform to most people's prior beliefs, probabilities for rates 1.5% and higher would decline monotonically with rate. In short, to find a believable probability distribution, the FEDISCOPE allows the possibility of very long tails.

The probabilities in Table 4 exhibit the same odd pattern for very low rates: the probability of a Fed funds rate of 0% is higher than the probability of a Fed funds rate of 0.25%. In this case, however, the FEDISCOPE accepts the assumption that the nominal target rate cannot be negative and does not extend the support below 0% to repair this odd shape. Put another way, if nominal rates cannot become negative, then all the probability of economic scenarios characterized by extremely low or negative real rates and extremely low or negative inflation are accumulated at a Fed funds rate of 0%.

Allowing a long tail for high Fed funds target rates might be desirable, but it raises a technical problem. How can so many probabilities be determined from relatively few option prices? The FEDISCOPE solves this problem by introducing smoothness into the optimization problem. On the assumption that a smooth probability distribution is more likely to reflect market views than a jagged one, the objectives of the FEDISCOPE comprise minimizing option pricing errors and maximizing smoothness. In particular, the FEDISCOPE tries several fits of varying degrees of smoothness and picks the smoothest one that manages to fit option prices with a root mean square error less than ½ bp. If no fit achieves that level of pricing accuracy, the FEDISCOPE chooses the best fit without considering smoothness.

The basic model preferably is adjusted when a meeting date or option expiration is in the near future. For meeting dates and option expirations that are soon after the pricing date, two assumptions of the FEDISCOPE turn out to be overly restrictive.

First, as a 1-factor model, the FEDISCOPE implicitly assumes that the Fed funds rate completely determines the state of the world. This is not true, of course, because, in particular, many 3-month LIBOR rates may be consistent with a single Fed funds rate. This is not a serious problem for dates far from the pricing date because the many possible realizations of the Fed funds rate generate sufficiently many realizations of Eurodollar futures rates. However, consider a Mar. 5, 2003, pricing date with EDH3 expiring on Mar. 17, 2003, and the next FOMC meeting on Mar. 18, 2003. Since, according to the model, the initial Fed funds rate of 1.25% cannot change until the meeting date on Mar. 18, 2003, there is only one possible Eurodollar futures rate on Mar. 17, 2003, the expiration date of the EDH3 options. The model's assumptions are overly restrictive in this case because by Mar. 17, 2003, the market may very well have changed its view about the outcome of the Mar. 18, 2003 meeting, and this change would be reflected in the pricing of EDH3 and its options. Therefore, in this and similar cases, the FEDISCOPE assumes that the subsequent meeting outcome is known as of the option expiration date. Note, by the way, that since the FEDISCOPE uses Eurodollar futures options to determine probability distributions, the model cannot construct these distributions for pricing dates between the expiration of the Eurodollar futures contract and the subsequent meeting date. In the example, once EDH3 expires on Mar. 17, 2003, the model can say nothing about the Mar. 18, 2003, meeting. Note that options on Fed fund futures, which began trading in March 2003, may be used for this purpose.

The assumption that the Fed funds rate moves in increments of 25 bp also turns out to be overly restrictive for option expiries and meeting dates in the near future. This is not a serious problem for dates far into the future because, as above, the many possible realizations of the Fed funds target rate generate sufficiently many realizations of Eurodollar futures rates. Also, for all but very near dates, Eurodollar futures option strikes are 25 bp apart. However, for expiration dates soon after the pricing date, there are few possible values for the target rate and strikes may be only 12.5 bp apart. As a result, there are too few realizations in the model to price options of different strikes accurately enough. To alleviate this problem, the FEDISCOPE assigns additional Eurodollar futures values to each Fed funds target rate realization.

The probability distributions shown and computed above are called unconditional distributions. By contrast, the probability distribution of the Fed funds rate after the Nov. 10, 2004, meeting given that the Fed funds rate is set to 1.50% at the Sep. 21, 2004, meeting is called a conditional distribution. Because the payoff to a Eurodollar futures option depends on 3-month LIBOR at option expiration and because that realization of 3-month LIBOR depends on a particular, 3-month realized path of Fed funds, conditional distributions of Fed funds are required to price Eurodollar futures options.

The description above made two simplifying assumptions in calculating a Eurodollar futures rate given a Fed funds rate. First, the expected change in the Fed funds rate was assumed to be the same across initial Fed funds rates. For example, the expected increase in the Fed funds rate over a particular meeting might be set to 25 bp whether the Fed funds rate going into that meeting was 1%, 2%, or 3%. Second, the Eurodollar futures contract was assumed to be priced using only the conditional expected path of Fed funds (as opposed to the entire distribution). This second assumption is actually quite a good approximation, but the FEDISCOPE preferably makes neither of these two assumptions.

To determine conditional distributions, the FEDISCOPE uses surrounding unconditional distributions and assumes that the FOMC prefers to change rates slowly. For example, EDH4 options essentially determine the unconditional probability distribution at the Mar. 16, 2004, meeting, while EDM4 options essentially determine the unconditional probability distribution at the Jun. 29, 2004 meeting. The conditional distributions from Mar. 16, 2004 are chosen to generate the smallest changes in the Fed funds rate consistent with the unconditional distribution on Jun. 29, 2004. This algorithm, unlike that used in the example above, does not equate expected changes across all initial Fed funds rates.

Everyone is a Fed watcher, and most everyone wants to know what Fed activity is built into market prices. But despite the ubiquity of the problem, most market participants extract the expected path of Fed funds in a relatively ad hoc manner and rarely attempt to uncover the probability distribution around that expected path. The FEDISCOPE attempts to provide a consistent and theoretically sound estimate of the probability distribution of the Fed funds target rate over the next two years as implied by short-term fixed income markets.

Fed watchers generate a very wide spectrum of trades, from outright long and short positions to complex relative value structures such as butterflies of Eurodollar futures options. But a subjective view of future Fed policy becomes a trade idea only when contrasted with the view implied by market prices. Furthermore, these trade ideas become actual trades, with fixed scale and risk, only after a discussion of the probability distribution around expected policy. From this perspective, the FEDISCOPE should be a useful tool for discussions about the initiation and scaling of Fed-watching trades.

While the present invention has been illustrated and described above regarding various embodiments, it is not intended to be limited to the details shown, since various modifications and structural changes may be made without departing in any way from the spirit of the present invention. Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

Embodiments of the present invention comprise computer components and computer-implemented steps that will be apparent to those skilled in the art. For ease of exposition, not every step or element of the present invention is explicitly described herein as part of a computer system, but those skilled in the art will recognize that each step or element may have a corresponding computer system or software component. Such computer system and/or software components are therefore enabled by describing their corresponding steps or elements (that is, their functionality), and are within the scope of the present invention.

For example, all calculations preferably are performed by one or more computers. Moreover, all notifications and other communications, as well as all data transfers, to the extent allowed by law, preferably are transmitted electronically over a computer network. Further, all data preferably is stored in one or more electronic databases.

What is claimed is:

1. A system comprising:
   memory operable to store at least one program; and
   at least one processor communicatively coupled to the memory, in which the at least one program, when executed by the at least one processor, causes the at least one processor to:
   access and process
   market data corresponding to and/or including: Fed fund futures, Eurodollar futures, Fed fund versus LIBOR basis swaps, and options on Eurodollar futures;
   ascertain a probability distribution for expected Eurodollar rates based on Eurodollar futures option data
   determine a probability distribution defining an expected Fed funds target rate at a date corresponding to a Federal Open Market Committee meeting based on said market data and said probability distribution for expected Eurodollar rates; and
   remove an interest rate risk premium from said ascertained expected Fed funds target rate.

2. The system of claim 1 wherein said processor is further configured to access and process market data associated with subjective probabilities, ascertain new prices for Fed fund futures, Eurodollar futures and Eurodollar futures options, and ascertain a value opportunity based on said new prices and said market data.

* * * * *